United States Patent [19]

Fischer et al.

[11] 4,013,587

[45] Mar. 22, 1977

[54] PROCESS FOR THE MANUFACTURE OF SPHERICAL ALUMINA-CONTAINING PARTICLES

[75] Inventors: Hermann Fischer, Evern; Hubert Schindler, Dollbergen; Winfried Kuhrt, Hannover-Kirchrode; Guenter Weidenbach, Hannover, all of Germany

[73] Assignee: Kali-Chemie Aktiengesellschaft, Hannover, Germany

[22] Filed: Feb. 3, 1976

[21] Appl. No.: 654,923

[30] Foreign Application Priority Data

Feb. 4, 1975 Germany .......................... 2504463
Oct. 16, 1975 Germany .......................... 2546318

[52] U.S. Cl. .......................... 252/448; 252/455 R; 252/463; 252/465
[51] Int. Cl.² .................. B01J 21/04; B01J 21/12; B01J 23/72; B01J 23/86
[58] Field of Search ............... 252/448, 455 R, 463, 252/465; 423/628, 630

[56] References Cited

UNITED STATES PATENTS

| | | | |
|---|---|---|---|
| 2,408,986 | 10/1946 | Marisic et al. | 252/448 X |
| 2,697,066 | 12/1954 | Sieg | 252/453 X |
| 3,416,888 | 12/1968 | Notari | 423/628 |

*Primary Examiner*—W. J. Shine
*Attorney, Agent, or Firm*—Bacon & Thomas

[57] ABSTRACT

Disclosed is process for the preparation of alumina-containing particles, comprising the steps of (a) mixing an aluminum oxide hydrosol containing a hydrate of alumina or activated alumina and an additive component selected from a high molecular weight natural organic material which is insoluble in aqueous solution up to a temperature of 50° C. and carbon with a solution of hydrolyzable base to form a mixture; (b) introducing the mixture in dispersed form into a water-immiscible liquid having a temperature of from about 60 to 100° C., whereby gel particles are formed; (c) aging the gel particles in the liquid at the temperature and subsequently in an aqueous ammonia solution; (d) recovering the aged particles; and (e) calcining the recovered particles.

19 Claims, No Drawings

PROCESS FOR THE MANUFACTURE OF SPHERICAL ALUMINA-CONTAINING PARTICLES

BACKGROUND OF THE INVENTION

The invention relates to a process for the manufacture of spherical, surface-rich and pore-rich particles from activated alumina or activated alumina which may also contain silica and/or catalytically active metals and/or metal oxides. These particles are distinguished by good mechanical and thermal stability and are suitable as carriers for bulk or bed catalysts.

For application in stationary beds, particles of distinct spherical geometry and identical size are advantageous over tablets and/or extruded or granulated preformed particles. Spherical particles provide a dense and more uniform packing upon pouring. This, in turn, results in a symmetrical distribution of the interstitial spaces so that uniform flow conditions are guaranteed for the stationary catalyst bed. It is also established that tablets, extruded bodies, and granules show a greater tendency to break than spherical particles. The edges and peripheral regions of the former are likely to break away during processing and/or during application. This results in the formation of dust and powder-like material which tend to impair the flow through bulk catalysts and/or are potentially capable of inhibiting such flow completely.

Alumina particles of strictly spherical geometric shape and identical size may be manufactured according to known processes by application of the so-called oil-drop method. In these processes, aluminum oxide hydrosol is mixed with a base, for instance, hexamethylene tetramine, which is hydrolyzable at elevated temperature. This mixture showing an acid pH-value will be sprayed or allowed to drop into a liquid immiscible with water and kept at elevated temperature, preferably a mineral oil. The specifically heavier sol droplets settle in the hot, precipitation-causing oil, they assume spherical geometry and they solidify to the gel under the influence of hydrolyzing effect of the base at the elevated temperature of the oil. The gel particles are still soft and not stable in aqueous solution. They are subjected to hardening by aging in hot oil. If necessary, they are subsequently treated under alkaline conditions before they are washed, dried, and calcined to convert them to activated alumina.

It is a serious drawback of this process, that the gel particles — due to their high water content — are subject to considerable shrinking upon the heat treatment. Tensions are generated as the consequence of this shrinking, which leads to the formation of cracks and the bursting of the particles. It has therefore been suggested in German Pat. No. 1,065,392 to add finely ground solid substances to the aluminum oxide hydrosol prior to the process of gel formation. Suitable solid substances are hydrate of alumina, activated alumina, silica gel, diatomaceous earth, Fuller's earth, or other catalytically active metal oxides. These solid substances may be added up to 90% by weight relative to the dry substance. These additives are not only intended for the prevention of the shrinking of the particles, and thus the formation of products which catalytically are of no use, rather, they are also added with the intention of providing an opportunity to modify the activity of the preformed particles as desired and to adapt the same to the given application as catalyst or catalyst carrier.

It has been observed according to the present invention, however, that despite the coprecipitation of aluminaor silica-containing fillers with gel-forming aluminum oxide hydrosols, a considerable proportion of the gel particles nevertheless become useless upon drying or calcination due to crack formation and/or bursting. The extent to which this proportion of useless particles is formed, is primarily a function of the particle size of the coprecipitated oxide or oxide hydrate as well as being a function of the quantity thereof. The addition of coarse-grained fillers results in a product, which, although the particles of which suffer only minor shrinking in the course of thermal treatment so that there is hardly any loss due to destruction of particles during production, exhibits mechanical stability of the particles inadequate for application as bulk catalysts or as carrier materials for catalysts. The finer the particle size of the coprecipitated component, the better is the resistance of the calcined particles to bursting and abrasion. However, the proportion of non-usable products increases strongly due to destruction during the heat treatment.

The above-described oil drop process according to the invention is according to a further embodiment of the invention also applicable to the direct manufacture of pellet-shaped catalysts without subsequent impregnation by the coprecipitation of catalytically active metals, metal salts or metal oxides.

It is already known that the activity of catalysts depends not only on the type of the metal compound applied but also on the process of incorporating the catalytically active metal into the carrier material and on the subsequent treatment of the product obtained. Most commonly the carriers are impregnated with solutions of the corresponding metal compound. Each such treatment is followed by the exposure to a high temperature process. Attempts to incorporate the active component in the form of solutions or as solids during the forming of the powder-like carrier material into extrudates, granulates or tablets result in the formation of catalysts having an activity which is considerably lower than that of the impregnated types.

It was therefore not to be expected that it would be possible in the process according to the invention to incorporate catalysts by the coprecipitation of compounds of catalytically active metals even during the forming of the carrier, and thus, to save a multitude of process steps.

German Pat. No. 1,065,392 describes the coprecipitation of finely ground alumina hydrate, activated alumina, silica gels, aluminum silicates, Fuller's earth, and other oxidic compounds suitable to function as carriers for catalysts, to which there may already have been added catalytically active components in metallic or oxidic form. See also German Auslegeschrift No. 2,027,878. Subsequent experiments have, however, shown that the coprecipitation of powder-like compounds of catalytically active metals and activated alumina or alumina hydrate in gel-forming aluminum oxide hydrosol results in the formation of spherical particles which do not display adequate catalytic activity.

SUMMARY OF THE INVENTION

It is therefore an object of the present invention to provide a process for the preparation of alumina-containing particles, preferably spherical particles suitable for use as carriers for bulk catalysts, which are surface-rich and pore-rich.

Another object of the invention is to provide a process for preparing such particles which exhibit excellent mechanical properties, such as breaking strength and abrasion resistance.

It is also an object of the invention to provide a simplified process for the preparation of catalytically-active metal-containing alumina based particles having the foregoing properties.

In accomplishing the foregoing objects, there has been provided according to the present invention a process for the preparation of alumina-containing particles, comprising the steps of (a) mixing an aluminum oxide hydrosol containing a hydrate of alumina or activated alumina and an additive component selected from a high molecular weight natural organic material which is insoluble in aqueous solution up to a temperature of 50° C. and carbon with a solution of hydrolyzable base to form a mixture; (b) introducing the mixture in dispersed form into a water-immiscible liquid having a temperature of from about 60° to 100° C., whereby gel particles are formed (c) aging the gel particles in the liquid at the temperature and subsequently in an aqueous ammonia solution; (d) recovering the aged particles; and (e) calcining the recovered particles. Optionally, the aluminum oxide hydrosol contains a silica-containing substance, and according to a further aspect of the invention, the hydrosol contains one or more difficultly water-soluble compounds of catalytically-active metals which in the non-soluble form are coprecipitated with the alumina-based carrier particles.

DESCRIPTION OF PREFERRED EMBODIMENTS

Surprisingly, it has now been demonstrated that the addition of high molecular weight organic natural products which are insoluble in aqueous solution up to temperatures of 50° C., for instance in the form of wood flour, starch or the like, or of carbon, e.g., in the form of carbon black, to precipitating mixtures which in addition to aluminum oxide hydrosol also contain hydrate of alumina and/or activated alumina and optionally also silica-containing substances, prevents any decrease in the quality of the precipitated particles due to crack formation or destruction during the thermal treatment. Over and above this, the addition of these substances results in a considerable reduction of the range of variation of the mechanical properties and the dimensions of the particles.

In order to attain the advantages indicated, it is sufficient to add these substances in amounts of 3 to 35%, preferably 5 to 25% relative to the weight of the calcined particles without impairing the mechanical stability of the particles in a given application. During calcination, these substances are removed practically quantitatively by combustion. In the case of wood flour, commercially available products are suitable for the purpose of the invention. Preference should be given to soft-to-medium-hard qualities. Since commercially available wood flour is frequently too course, it is advantageous to grind the same to a finer particle size.

In comparison to other products, which appear suitable as additives on the basis of their chemical composition or their properties, the substances indicated, in particular the very reasonably priced wood flour, have proven to be additives capable of producing the desired effects. These effects must evidently be associated with the fact that the substances are only subject to cumbustion in the particles at relatively high temperatures, i.e., above 500°–600° C.; at these temperatures, however, the oxidic particles are solidified to a degree, that tension related destruction no longer occurs.

The coprecipitation of the substances indicated has the added advantage that the calcined particles show a lower bulk density than those prepared without the incorporation of these additive substances. Lower bulk densities are desirable, since they result in lower heat capacities, as a result of which, in turn, the operating temperature of a catalyst is reached more rapidly.

Yet another advantage of the substances mentioned, in particular of finely ground wood flour, is the fact that they are subject to combustion during calcining of the gel particles, to result in formation of pores, of which a considerable number show a diameter of more than 1000 A, i.e., they are macropores. This fact is remarkable in the sense that, in the commonly employed processes for the manufacture of catalyst carriers of alumina, calcining at temperatures of up to approximately 800° C. results predominantly in the formation of micropores, while macropores are only formed in noticeable numbers at higher calcining temperatures. It is, however, known that for numerous reactions optimum properties are only obtained with carrier substances possessing a biporous structure, i.e., those showing macro as well as micropores. Microporosity results in high dispersity of the applied catalytically active components, while macropores afford favorable diffusion conditions for the catalytic reaction. The process according to the invention, thus, offers the possibility of manufacturing carrier substances with biporous structures.

The application of the substances mentioned has proved to be particularly advantageous for the production of spherical particles which in addition to activated alumina also contain a pyrogenic silica. Silica-containing alumina particles enjoy wide application. For instance, they are used as catalysts or catalyst carriers in cracking or hydrocracking processes. The coprecipitation of silica gels, diatomaceous earth or Fuller's earth in addition to activated alumina and/or hydrate of alumina with gel forming aluminum oxide hydrosol, however, results in the formation of particles which, despite the addition of the substances indicated, do not show particularly favorable mechanical and textural properties. If, however, the $SiO_2$ component consists of low density silica of the finest distribution, as prepared by hydrolysis of silicon tetrachloride in an oxyhydrogen flame and known under the designation pyrogenic silica, one then obtains a product which is practically free of waste. Its particles are free from cracks or other mechanical defects. Other desirable properties are, almost identical particle size, high specific surface area, a high pore volume, low bulk density as well as considerable resistance to abrasion and bursting.

Spherical particles obtained by the coprecipitation of activated alumina and/or hydrate of alumina with the addition of the substances indicated consist after calcining at temperatures above 600° C. of pure aluminum oxide, of which 15 to 35% by weight is derived from the aluminum oxide hydrosol. Particles prepared by the same procedure and containing alumina and silica may contain subsequent to the calcining process from 10 to 40% by weight silicon dioxide and 90 to 60% by weight aluminum oxide, of which 15 to 35% of the aluminum oxide is likewise derived from the hydrosol.

According to the invention, mechanically and thermally stable surface-rich and pore-rich spherical particles may be prepared from activated alumina or activated alumina and silica in an almost quantitative yield.

If consideration is given only to the carrier and if it may contain silica, in light of the intended application, one proceeds according to a preferable embodiment as follows:

A concentrated aluminum oxide hydrosol of a pH value in the range of 3 to 5 is prepared by dissolving aluminum metal in hydrochloric acid and/or aluminum chloride in aqueous solution or by dissolving commercially available aluminum hydroxychloride in water, the concentration of which is adjusted so that the $Al_2O_3$ derived from the sol amounts to 15 to 35% by weight, preferably to 20 to 30% by weight of the mass of the calcined particles;

to the hydrosol is added with stirring alumina hydrate and/or activated alumina, preferably of an average particle diameter of maximally $10\mu$, in an amount so that the $Al_2O_3$ content amounts to 65 to 85% by weight, preferably 70 to 80% by weight of the calcined particles;

in certain cases as proportional substitute of the aluminum oxide containing filler their is added to the hydrosol a quantity of pyrogenic silica such that the $SiO_2$ content of the calcined particles amounts to 10 to 40% by weight; adding to the mixture obtained a soft to medium-hard wood flour, preferably freshly ground to a finer particle size in a quantity of 5 to 35% by weight, preferably 10 to 25% by weight relative to the mass of the calcined particles; this hydrosol which contains filler and wood flour is mixed with a concentrated aqueous solution of hexamethylene tetramine; and spraying or allowing the mixture consisting of hydrosol, gel forming agent, wood flour, and filler to drop into a column filled with the mineral oil of a temperature of 60 to 100° C.; the gel particles are allowed to remain at the temperature of precipitation for a period of time from 4 to 16 hours; thereafter the gel particles are aged for 2 to 8 hours in aqueous ammonia solution, washed with water, dried at 100° to 150° C., or preferably at from about 120–200° C. preheated to 250° to 400° C. and calcined at a temperature of 600° to 1000° C.

The above-described oil drop process according to the invention is according to a further embodiment of the invention also applicable to the direct manufacture of pellet-shaped catalysts without subsequent impregnation by the coprecipitation of catalytically active metals, metal salts or metal oxides.

It has now been found that catalyst beads may be obtained which compare favorably with catalysts prepared by impregnation, not only with regard to their mechanical properties but also with regard to their catalytic activity. In order to accomplish this, it is necessary to add the substances mentioned (i.e., high molecular weight organic compounds insoluble in aqueous solution up to a temperature of 50° C. or carbon) to the precipitation mixtures consisting of aluminum oxide hydrosol, the base, the alumina and/or aluminum hydrate powder as well as the powder-like compounds of catalytically active metals. For the production of catalysts, in addition to wood flour, starch and carbon black, have been found to be particularly suitable. These additives are subject to complete combustion once the beads are exposed to the conditions of calcination. It is remarkable that their addition does not impair the mechanical stability of the calcined catalyst particles.

In order to obtain the required catalytic activity it is sufficient to use the additives in amounts of 3 to 30%, preferably in amounts of 5 to 20% relative to the weight of the calcined particles. Commercially available grades of wood flour, carbon black, carbon powder, and starch are suitable for the purposes of the invention; it is however, advisable to grind coarser powders to a smaller particle size.

The coprecipitation of the subject additives also results in this case in a lower bulk density of the catalyst particles after thermal treatment than that exhibited by those prepared without these additives.

All amorphous and crystalline alumina hydrates and all activated aluminas are suitable for the purpose of coprecititation. In the case of using alumina trihydrates, depending on their properties, it may be advisable to partially or completely dehydrate them at elevated temperatures. The prior grinding of aluminas and their hydrates to medium particle sizes below $10\mu$ shows positive effects on the mechanical properties of the catalyst particles.

The catalytically active components are added to the aluminum oxide hydrosol in the form of their primarily water-insoluble compounds, preferably subsequent to grinding to particle sizes below $150\mu$. Applicable catalytically active metals are those in the V. through the VIII. group of the Periodic System as well as silver and copper.

It has been found advantageous to prepare particularly mechanically stable catalysts in two calcination steps, namely an initial one at 300° to 400° C. and a subsequent one at 600° to 1000° C.

The process according to the invention is particularly suitable for the manufacture of Cu/Cr catalysts for exhaust gases of automobiles. These products meet the more stringent requirements of a catalyst for exhaust gases of automobiles with regard to their mechanical properties as well as also their catalytic activity. Showing uniform size, symmetrical form and a smooth surface, these catalysts provide a homogenous and dense packing when formed into a bed. This results not only in a symmetric distribution of the interstitial spaces, a feature of importance for even flow through the catalyst bed, but this also substantially prevents the abrasion of individual particles, since the particles do not have the opportunity to move against each other or against the wall of the reaction container.

These catalysts are also distinguished by a high degree of resistance to abrasion and breaking, features which are even maintained after prolonged usage at elvated temperatures and which are not diminished by rapidly occuring and constantly recurring variations in temperature.

According to a preferred embodiment of the invention, mechanically and thermally stable spherical particles with the good catalytic activity may be obtained from activated alumina, copper and chromium oxide in nearly quantitative yield by:

preparing a concentrated aluminum oxide hydrosol having a pH value of 3 to 5 by dissolving aluminum metal in hydrochloric acid or dissolving commercially available aluminum hydroxychloride in water, the concentration of which is adjusted so that the aluminum oxide derived from the sol amounts to 15 to 35% by weight, preferably 20 to 30% by weight of the calcined particles;

mixing the hydrosol under stirring conditions with copper (II) oxide and chromium (III) oxide of a particle size of 5 to 100μ in a quantity such, that the content of the particles in copper (II) oxide and in chromium (III) oxide subsequent to their calcination amounts to 3 to 15% by weight each, preferably 7 to 10% by weight each (instead of the oxides, corresponding quantities of copper and chromium salts may also be coprecipitated as as long as they are decomposed at the calcination temperature of the beads to form the oxides and without leaving other solid residues);

by thereafter adding with stirring to the hydrosol such a quantity of activated alumina and/or alumina hydrate of an average particle diameter of maximally 10μ that the content of the particles in $Al_2O_3$ amounts to 35 to 79% by weight, preferably 50 to 66% by weight relative to the weight of the final catalyst;

adding to the hydrosol wood flour or starch of a particle size of maximally 100μ or carbon black or carbon powder of a particle size of maximally 100μm. in a quantity of 3 to 30% by weight, preferably 5 to 20% by weight relative to the mass of the calcined particles;

intensely mixing the suspension obtained with concentrated aqueous solution of hexamethylene tetramine;

spraying and/or allowing the solution to drop and/or to flow into a column filled with mineral oil of a temperature of 60° to 100° C.; and allowing the gel particles to remain in the oil for 4 to 16 hours at the temperature of the precipitation and by aging the particles subsequently for 2 to 8 hours in aqueous ammonia solution at a temperature of 60° to 100° C., by washing the particles with water, drying them at 120° to 200° C. and by calcining them in two steps, initially at 300° to 400° C. and subsequently at 600° to 1000° C.

The catalysts prepared in this fashion consist subsequent to their calcination at temperatures above 600° C. only of a mixture of the oxides of aluminum, copper, and chromium, whereby 3 to 15% by weight each consists of copper (II) oxide and chromium (III) oxide and 15 to 35% by weight consists of aluminum oxide derived from the aluminum oxide hydrosol. The remainder is aluminum oxide derived from the coprecipitated alumina or its hydrate.

The addition of silica is omitted for cases in which the catalysts thus prepared are to be used as catalysts for the exhaust gases of automobiles.

The following examples are intended to serve as further illustrations of the invention without, however, restricting the same to the applications described.

EXAMPLE 1

To 5 l. of an aluminum oxide hydrosol prepared by treating aluminum shot with hydrochloric acid and containing 500 g. of aluminum corresponding to 945 g. of $Al_2O_3$, are added with stirring 4.73 kg. of finely ground gibbsite, which has been partially dehydrated at 250° C. and shows an average particle size of 2μ and an alumina content of 80% by weight, corresponding to 3.785 kg. $Al_2O_3$, as well as 250 g. of soft wood flour which has been ground for 16 hours in a ball mill. To the suspension is added at room temperature and under intensive mixing a concentrated aqueous solution of hexamethylene tetramine containing 400 g. of hexamethylene tetramine. The mixture is allowed to drop into a 2 m. long column filled with mineral oil heated to 90° to 95° C. The resulting spherical gel particles are withdrawn in batches from the bottom of the column, and they are allowed to age for 10 hours in mineral oil at 95° C. and subsequently for 6 hours in 0.5% aqueous ammonia solution, before being washed in running water, being dried at 120° C., and heated for one hour each at 350° C. and 800° C.

Following calcination the resulting product is liberated from fines as well as broken or decomposed particles by prolonged sieving with intensive shaking of a sieve with an open mesh width of 2 mm. In the course of this treatment those particles which, although already showing cracks, did as yet not break, are destroyed and thus are also removed from the useable product. The remaining material will be expressed in terms of percent by weight and reported as "yield".

EXAMPLE 2

To 5.5 l. of an aluminum oxide hydrosol with 500 g. of aluminum corresponding to 945 g. $Al_2O_3$ are added with stirring 3.545 kg. of partially dehydrated gibbsite of the quality stated in Example 1, corresponding to 2.836 kg. $Al_2O_3$, as well as 900 g. of medium-hard, fine wood flour. The suspension is combined with an aqueous solution containing 400 g. of hexamethylene tetramine, well mixed and further treated as described in Example 1.

EXAMPLE 3

To 5.34 l of aluminum oxide hydrosol with 266 g. of aluminum, corresponding to 500 g. $Al_2O_3$, are added with stirring and in successive order 876 g. of gibbsite of the quality indicated corresponding to 701 g. $Al_2O_3$, 800 g. Aerosil$^R$, 200 g. of fine soft wood flour and a concentrated aqueous solution of hexamethylene tetramine corresponding to 412 g. of hexamethylene tetramine. The subsequent treatment of the precipitation mixture corresponds to that of Example 1.

EXAMPLE 4

A precipitation mixture is prepared from 4.54 l. of aluminum oxide hydrosol with 266 g. of aluminum equal to 500 g. $Al_2O_3$, 1.376 kg. gibbsite of the quality stated, equal to 1.1 kg. $Al_2O_3$, 400 g. Aerosil, 400 g. of finely ground wood flour of a medium hard quality and a saturated aqueous solution with 412 g. of hexamethylene tetramine. The mixture is subjected to the treatment as described in Example 1.

EXAMPLE 5

To 4.14 l. of aluminum oxide hydrosol with 266 g. of aluminum equal to 500 g. $Al_2O_3$, are added successively with stirring and subsequent intensive mixing 1.624 kg. of gibbsite of the quality stated, equal to 1.3 kg. $Al_2O_3$, 200 g. Aerosil, 600 g. of fine soft wood flour and 412 g. of hexamethylene tetramine in the form of a saturated aqueous solution. Further treatment of the precipitation mixture is as stated in Example 1.

The following examples describing the manufacture of alumina particles and/or of silica-containing alumina particles without the additives according to the invention are intended to demonstrate the advantages of the invention.

EXAMPLE 6 (not according to the invention)

A precipitation mixture is prepared from 4.92 l. of aluminum oxide hydrosol with 498 g. of aluminum corresponding to 942 g. $Al_2O_3$, 3.525 kg. of gibbsite of the quality stated, equal to 2.82 kg. $Al_2O_3$, and 387 g. of hexamethylene tetramine in concentrated aqueous solution. The precipitation mixture is further treated as stated in Example 1 to produce alumina beads.

EXAMPLE 7 (not according to the invention)

To 5.91 l. of aluminum oxide hydrosol with 399 g. aluminum equal to 753 g. $Al_2O_3$ are added with stirring 1.875 kg. of gibbsite of the quality stated, equal to 1.5 kg. $Al_2O_3$, 750 g. Aerosil, and 618 of hexamethylene tetramine in the form of a concentrated aqueous solution. The precipitation mixture is subsequently treated as described in Example 1.

For the particles prepared according to the examples 1 through 7 which were subsequently sieved and showed an average diameter of approximately 3 to 3.7 mm. the bulk density, the bursting strength, the abrasion, the specific surface according to the BET-method and the total pore volume are determined. The values are presented in Table I.

The total pore volume of the particles is calculated from the measured value of the real density determined by pycnometer measurement in toluene and the measured value of the apparent density derived from pycnometer measurement with mercury.

The resistance to abrasion is determined according to the following test:

An iron cylinder having a volume of 200 ml., a diameter of 50 mm. and a height of 100 mm. is filled with particles to a volume of 150 ml. The cylinder is then subjected to shaking at frequency of 300 vertical movements per minute and an amplitude of 100 mm. That proportion in mass which is isolated in the course of the second hour of the test and passes a sieve with an open mesh size of 2 mm. is considered "abrasion".

The test values obtained are recorded in the following Table I.

The values reported in Table I show that the yield in useful particles is considerably greater in the case of the process according to the invention than in that in which the precipitation is conducted without the addition of wood flour. This results from the fact that, on the one hand, there is hardly any tension-related destruction of particles in the case of the addition of wood meal and that, on the other hand, the proportion of undersized particles is very low. It is furthermore a fact, that the pore volume and the specific surface are considerably greater for particles prepared according to the invention. Their bulk density on the other hand, is significantly reduced by comparison with beads prepared according to the known processes of Examples 6 and 7. Thus, the mechanical strength properties are not at all affected by the addition of the wood flour.

EXAMPLE 8

To 5 l. of an aluminum oxide hydrosol of a pH value of 4 which contains 500 g. of aluminum corresponding to 945 g. $Al_2O_3$ are addded successively and with intensive stirring 3.02 kg. of a pseudoboehmite of an average particle diameter of $3\mu$ and an alumina content of 75% by weight, corresponding to 2.265 kg. $Al_2O_3$, 272 g. of finely ground chromium (III) oxide, 295 g. of finely ground copper (II) oxide powder (particle size of the oxides between 5 and $100\mu$), 570 g. of soft wood flour (54% smaller than $45\mu$, remainder up to $100\mu$) ground in a ball mill, as well as a concentrated aqueous solution of hexamethylene tetramine having a content of 400 g. of hexamethylene tetramine. The mixture is allowed to drop into a 2 m. long column filled with mineral oil heated to 90° to 95° C. The resulting gel particles are removed in batches from the bottom of the column, they are then allowed to age for 12 hours at 90° C. in mineral oil and subsequently for 4 hours at 90° C. in 0.5% aqueous ammonia solution. After washing in running water, the particles are dried at 140° C. before being heated for 1 hour at 350° C. and subsequently at 700° C.

The final product of catalyst No. 8 contains 7.8% by weight CuO and 7.2% by weight of $Cr_2O_3$.

EXAMPLE 9

To 5 l. of an aluminum oxide hydrosol, the pH value and aluminum concentration of which correspond to the sol used in Example 8, are added successively with stirring and intensive mixing 2.83 kg. of finely ground gibbsite partially dehydrated at 250° C. and with an average particle diamter of $2\mu$ and an alumina content of 80% by weight, corresponding to 2.264 kg. $Al_2O_3$, 272 g. of chromium (III) oxide and 295 g. copper (II) oxide of the same particle sizes as in Example 8, 190 g. of rice starch of a particle size of up to $100\mu$ as well as a saturated aqueous solution with 390 g. of hexamethylene tetramine. Further treatment of the suspension is carried out as described in Example 8.

The final product of catalyst No. 9 contains 7.8% by weight CuO and 7.2% by weight of $Cr_2O_3$.

EXAMPLE 10

A precipitation mixture is prepared from 4.40 l. of aluminum oxide hydrosol with 400 g. of aluminum corresponding to 756 g. $Al_2O_3$, 2.40 kg. of pseudoboehmite of the quality stated in Example 8 and corresponding to 1.80 kg. $Al_2O_3$, 216 g. of chromium (III) oxide, 234 g. of copper (II) oxide both of the same particle size as stated in Example 8, 160 g. of wettable carbon black of an average particle size of 240 A and a concentrated aqueous solution with 310 g. of hexamethyl-

TABLE I

| Example | Composition of the Particles (wt.%) | | | Wood Flour (wt.-%*) | Yield % | Bulk Density kg/l | Bursting Strength kp | Abrasion % | Specific Surface m²/g | Pore Volume ml/g |
| --- | --- | --- | --- | --- | --- | --- | --- | --- | --- | --- |
| | $Al_2O_3$ from Sol | $Al_2O_3$ from Alumina | $SiO_2$ | | | | | | | |
| 1 | 20.0 | 80.0 | — | 5.3 | 96 | 0.60 | 5 | 0 | 93 | 0.60 |
| 2 | 25.0 | 75.0 | — | 23.8 | 97 | 0.54 | 5 | 0.95 | 104 | 0.65 |
| 3 | 25.0 | 35.0 | 40.0 | 10.0 | 97 | 0.47 | 6 | 0 | 148 | 0.84 |
| 4 | 25.0 | 55.0 | 20.0 | 20.0 | 98 | 0.55 | 9 | 0 | 154 | 0.64 |
| 5 | 25.0 | 65.0 | 10.0 | 30.0 | 96 | 0.47 | 5 | <0.5 | 143 | 0.68 |
| 6 | 25.0 | 75.0 | — | — | 65 | 0.70 | 5 | 2 | 93 | 0.51 |
| 7 | 25.1 | 49.9 | 25.0 | — | 70 | 0.63 | 5 | <0.5 | 140 | 0.57 |

*Based upon the mass of the calcined particles ene tetramine. The precipitation mixture is subjected to further treatment as described in Example 8.

The final product of catalyst No. 10 contains 7.8% by weight CuO and 7.2% by weight $Cr_2O_3$.

EXAMPLE 11 (not according to the invention)

To 4.40 l. of aluminum oxide hydrosol with 400 g. of aluminum corresponding to 756 g. $Al_2O_3$ are added successively and with stirring 2.40 kg. of pseudoboehmite of the quality stated in Example 8 and corresponding to 1.80 kg. $Al_2O_3$, 216 g. of chromium (III) oxide, 234 g. of finely ground copper (II) oxide, both of the particle sizes given in Example 8, as well as 310 g. of hexamethylene tetramine in the form of a saturated solution. The subsequent treatment of the precipitation mixture corresponds to that reported in Example 8.

The final product of Catalyst No. 11 contains 7.8% by weight CuO and 7.2% by weight $Cr_2O_3$.

The calcined catalyst particles prepared according to Examples 8 through 11 are liberated from fines and broken or decomposed particles by sieving through a sieve having an open mesh size of 2mm. The proportion remaining on the sieve amounts to at least 95% by weight for all products prepared in the process according to the invention. This proportion, the particles of which show nearly exclusively a diameter of 3 to 3.8 mm. will be used for the determination of the bulk density, the bursting strength, the resistance to abrasion and the specific surface with an areameter (Chem.-Ing.-Techn. 40, 1968, p. 1181).

The resistance of the catalyst particles to abrasion is determined according to the procedure described above.

The measured values obtained are compiled in the following Table II.

temperature equilibrium is established, the measurement takes place under nearly adiabatic reactor conditions.

By means of graphic interpolation of the curve constructed with the help of the measured valus obtained, it is possible to determine the temperature at which 50% of the CO and ethylene have been converted.

This half-value temperature ($T_{50}$) serves as an activity coefficient. Following testing in the freshly prepared state under the conditions given, the catalysts are aged in air for 100 hours at 900° C. and subsequently tested again. The results are presented in Table III.

They show that the catalysts 8 to 10 according to the invention surpass the control catalyst in the fresh condition. The superiority of the present catalysts is shown particularly clearly after aging, whereby the control catalyst experiences so considerable a loss of activity that a 50% conversion of ethylene is no longer achievable.

TABLE III

| Catalyst | Aging | CO-Conversion 50% (° C.) | $C_2H_4$-Conversion 50% (° C.) |
|---|---|---|---|
| 8 | Fresh | 227 | 311 |
|   | 100h 900° C | 255 | 387 |
| 9 | Fresh | 218 | 321 |
|   | 100h 900° C. | 220 | 379 |
| 10 | Fresh | 212 | 325 |
|    | 100h 900° C. | 229 | 390 |
| 11 | Fresh | 280 | 357 |
|    | 100h 900° C. | 287 | not achieved |

What is claimed is:
1. A process for the preparation of alumina-containing particles, comprising the steps of:
   a. mixing an aluminum oxide hydrosol containing a

TABLE II

| EXAMPLE | COMPOSITION OF THE PARTICLES (wt.%) | | | | ADDITIVE (wt.-%)* | BULK DENSITY kg/l | BURSTING STRENGTH kp | ABRASION (wt.-%) | SPECIFIC SURFACE $m^2/g$ |
|---|---|---|---|---|---|---|---|---|---|
| | $Al_2O_3$ HYDROSOL | $Al_2O_3$ ALUMINA | COPPER OXIDE | CHROMIUM OXIDE | | | | | |
| 8 | 25.0 | 60.0 | 7.8 | 7.2 | 15.1 Wood Flour | 0.68 | 7 | 1.4 | 87 |
| 9 | 25.0 | 60.0 | 7.8 | 7.2 | 5.0 Rice Starch | 0.81 | 12 | 1.2 | 89 |
| 10 | 25.1 | 59.9 | 7.8 | 7.2 | 5.3 Carbon Black | 0.82 | 10 | 1.4 | 90 |
| 11 | 25.1 | 59.9 | 7.8 | 7.2 | — | 0.90 | 8 | 1.5 | 85 |

*Based upon the mass of the calcined particles

EXAMPLE 12

For the purpose of testing their oxidation activity the catalysts 8 through 11 are exposed to a gas mixture corresponding to the exhaust gas of automobiles and consisting of:

| | |
|---|---|
| 300 ppm | ethylene |
| 1 Vol.-% | carbon monoxide |
| 10 Vol.-% | carbon dioxide |
| 10 Vol.-% | water vapor |
| 3 Vol.-% | oxygen |
| remainder | nitrogen |

The space velocity is 40,000 v/vh. The residual content of CO and ethylene are determined at the exit from the catalyst bed using Uras (CO) and FID (ethylene) for stepwise increases in the gas inlet temperature. Once hydrate of alumina or activated alumina and an additive component of wood flour, starch, carbon black or carbon powder with a solution of a hydrolyzable base to form a mixture;
   b. introducing said mixture in dispersed form into a water-immiscible liquid having a temperature of from about 60° to 100° C., whereby gel particles are formed;
   c. aging said gel particles in said liquid at said temperature and subsequently in an aqueous ammonia solution;
   d. recovering said aged particles; and
   e. drying and calcining said recovered particles.
2. The process of claim 1, wherein said recovery step comprises washing said particles with water and drying said washed particles.

3. The process of claim 1, wherein said aluminum oxide hydrosol further contains a low density silica-containing substance.

4. The process of claim 1, wherein said additive component comprises wood flour or starch having a particle size of up to about 100μ.

5. The process of claim 1, wherein said additive component comprises carbon black having a particle size of up to about 100 mμ.

6. The process of claim 1, wherein said additive component is present in an amount sufficient to provide from about 3 to 35% by weight based upon the weight of the calcined particles.

7. The process of claim 6, wherein said amount is between about 5 and 25%.

8. The process of claim 1, wherein said particles are dried at a temperature of from about 120° C. to 200° C. and are calcined first at a temperature of between about 250° C. to 400° C. and then at a temperature of between about 600° C. and 1000° C.

9. The process of claim 1, wherein said aluminum oxide in said hydrosol is present in an amount sufficient to provide from about 15 to 35% by weight $Al_2O_3$ based upon the mass of the calcined particles.

10. The process of claim 9, wherein said aluminum oxide in said hydrosol provides from about 20 to 30% of said $Al_2O_3$.

11. The process of claim 1, wherein the hydrate of alumina or the activated alumina has an average particle diameter of up to about 10 μ.

12. The process of claim 1, wherein the hydrate of alumina or the activated alumina is present in said hydrosol in an amount sufficient to provide from about 65 to 85% by weight of the calcined particles.

13. The process of claim 12, wherein said amount is from about 70 to 80% by weight.

14. The process of claim 3, wherein said silica-containing substance is present in an amount sufficient to provide a $SiO_2$ content of from about 10 to 40% by weight of the calcined particles.

15. The process of claim 3, wherein said silica-containing substance comprises a pyrogenic silica.

16. The process of claim 2, wherein said aluminum oxide hydrosol further contains a difficulty-soluble compound of at least one catalytically-active metal.

17. The process of claim 16, wherein said catalytically active metal comprises copper and chromium.

18. The process of claim 17, wherein said compounds of copper and chromium are present in an amount sufficient to provide a content of from about 3 to 15% by weight based upon the calcined particles each of copper-2-oxide and chromium-3-oxide.

19. The process of claim 18, wherein said copper-2-oxide and chromium-3-oxide content are each from about 7 to 10% by weight.

* * * * *